United States Patent [19]

Fujita et al.

[11] Patent Number: 4,881,963
[45] Date of Patent: Nov. 21, 1989

[54] GRANULER FERTILIZER WITH A DEGRADATIVE COATING

[75] Inventors: Toshio Fujita; Yoshisato Yamashita; Shigemitsu Yoshida; Katsutoshi Yamahira, all of Minamatashi, Japan

[73] Assignee: Chisso Corporation, Osaka, Japan

[21] Appl. No.: 64,576

[22] Filed: Jun. 22, 1987

[51] Int. Cl.⁴ .............................................. C05G 3/10
[52] U.S. Cl. ..................................... 71/64.07; 71/27; 71/904
[58] Field of Search .......... 71/64.07, 27, 904, DIG. 1; 525/185

[56] References Cited

U.S. PATENT DOCUMENTS 3,780,140 12/1973 Hammer ............................... 525/185

FOREIGN PATENT DOCUMENTS 0098265 8/1978 Japan ................................. 71/64.07
0147538 9/1982 Japan ................................. 525/185
0045188 3/1983 Japan ................................. 71/64.07

Primary Examiner—Ferris H. Lander
Attorney, Agent, or Firm—Fred Philpitt

[57] ABSTRACT

A granular fertilizer with a degradative coating characterized in that after it has been applied to soil and its fertilizer component has dissolved out, the resulting coating part degrades rapidly is provided, which degradative coating comprises an ethylene-carbon monoxide copolymer as its indispensable component and a rubbery resin, an ethylene-vinyl acetate copolymer resin or powder as an optional component.

9 Claims, 1 Drawing Sheet

GRANULER FERTILIZER WITH A DEGRADATIVE COATING

BACKGROUND OF THE INVENTION

1. Field of the Invention

This invention relates to a granular fertilizer with a coating which degrades by light or oxidation. More particularly it relates to a granuler fertilizer with a coating comprising an ethylene-carbon monoxide copolymer. As to the product of the present invention, it is possible to adjust the dissolving-out rate of the fertilizer component, depending on the preparation conditions of the coating.

2. Description of the Related Art

In recent years, coated granular fertilizers obtained by encapsulating i.e. coating granular fertilizers to adjust the dissolving-out rate of fertilizer component have been developed and gradually come to be practically used.

Such coated granular fertilizers include mainly those of the following two types in the aspect of coating process:

① those obtained by relatively thickly coating granular fertilizers with sulfur, wax or low molecular polyolefins and ② those obtained by relatively thinly coating them with high molecular materials such as polyolefins, etc.

However, the latter, i.e. those coated with high molecular materials, are superier in the aspect of the high adjustability of the dissolving-out rate and small damage to the coating at the time of handling, etc. On the other hand, the latter have raised the problem that, the coating step with the high molecular materials is technically not easy, and decomposition of the residualcoated material remaining after the product (coated granu-lar fertilizer) has been applied to soil requires a long time.

The present inventors have previously developed the technique of coating granular fertilizers with high molecular materials and controlling the dessolving-out rate of the fertilizer component and have applied for patent. For example, the present inventors disclosed a coating technique with a polyolefin resin solution and a technique of controlling the dissolving-out rate by the use of a surfactant (Japanese patent publication No. Sho 50-99,858/1975) and also disclosed a high level technique of controlling the dissolving-out rate by the simultaneous use of a polyolefin resin, an ethylene-vinyl acetate coplymer and a surfactant (Japanese patent publication No. Sho 60-37,074/1985). Further the present inventors disclosed a technique wherein by using a material obtained by further mixing and dispersing a mineral powder such as talc or sulfur powder in a polyolefin resin composition similar to the above, it is possible to not only control the dissolving-out rate of the fertilizer component, but also promote degradation or decomposition of the residual capsule i.e., the coating residue after use (application to soil) of granular fertilizer (Japanese patent publication No. Sho 60-3,040/1985 and Japanese patent application laid-open No. Sho 55-1,672/1980). However, the effectiveness of promoting the degradation or decomposition cannot yet be said to be sufficient. Thus, a higher level coating has been desired.

SUMMARY OF THE INVENTION

In view of the above-mentioned technical problem relative to the functions of coated granular fertilizers, the present inventors have made extensive research in order to find a coated granular fertilizer characterized in that after it is applied to soil, the resulting coating as a residue of the coated granular fertilizer decomposes during a short period and constitutes a portion of soil. As a result, we have found that when an ethylene-carbon monoxide copolymer weight is used as a high molecular material for forming the coating, the above-mentioned problems can be solved to a large extent, and have achieved the present invention.

As apparent from the foregoing, the object of the present invention is to provide a coated granular fertilizer characterized in that after it has been applied to soil and its fertilizer component has dissolved out, the resulting coating part degrades rapidly.

The present invention resides in the following constitutions (1) to (6):

(1) A granular fertilizer with a degrative coating comprising an ethylene-carbon monoxide copolymer.

(2) A granular fertilizer according to item (1) comprising as its active ingredients, said ethylene-carbon monoxide copolymer and at least one resin selected from the group consisting of rubbery resins and ethylene-vinyl acetate copolymer resins.

(3) A granular fertilizer with a degradative coating according to item (2) wherein said rubbery resins are at least one resin selected from the group consisting of natural rubber, polyisoprene, polybutadiene, styrene-butadiene block copolymers and styrene-isoprene block copolymers and said ethylene-vinyl acetate copolymer resins are at least one resin selected from the group consisting of ethylene-vinyl acetate copolymer and ethylene-vinyl acetate-carbon monoxide copolymer.

(4) A granular fertilizer with a degradative coating according to item (1) comprising as its active ingredients, said ethylene-carbon monoxide copolymer and at least one resin selected from the group consisting of ethylene-ethyl acrylate copolymer and ethylene-methacrylic acid copolymer.

(5) A granular fertilezer with a degradative coating according to item (1) wherein said coating has a water-difficultly soluble or water-insoluble powder mixed therein.

(6) A granular fertilizer with a degradative coating according to item (2) wherein said coating has a water-difficulthy soluble or water soluble powder mixed therein.

(7) A granular fertilizer with a degradative coating according to item (3) wherein said coating has a water-difficulthy soluble or water-insoluble powder mixed therein.

(8) A granular fertilizer with a degradative coating according to item (5) wherein said water-difficultly soluble or water-insoluble powder is at least one member selected from the group consisting of talc, calcium carbonate, clay, diatomaceous earth, silica, metal silicates, metal oxides, sulfur and starch powder.

(9) A granular fertilizer with a degrative coating according to item (6) wherein said water-difficultly soluble or water-insoluble powder is at least one member selected from the group consisting of talc, calcium carbonate, clay, diatomaceous earth, silica, metal silicates, metal oxides, sulfur and starch powder.

(10) A granular fertilizer with a degrative coating according to item (7) wherein said water-difficultly soluble or water-insoluble powder is at least one member selected from the group consisting of talc, calcium carbonate, clay, diatomaceous earth, silica, metal silicates, metal oxides, sulfur and starch powder.

DETAILED DESCRIPTION OF PREFERRED EMBODIMENTS

Figure 1:
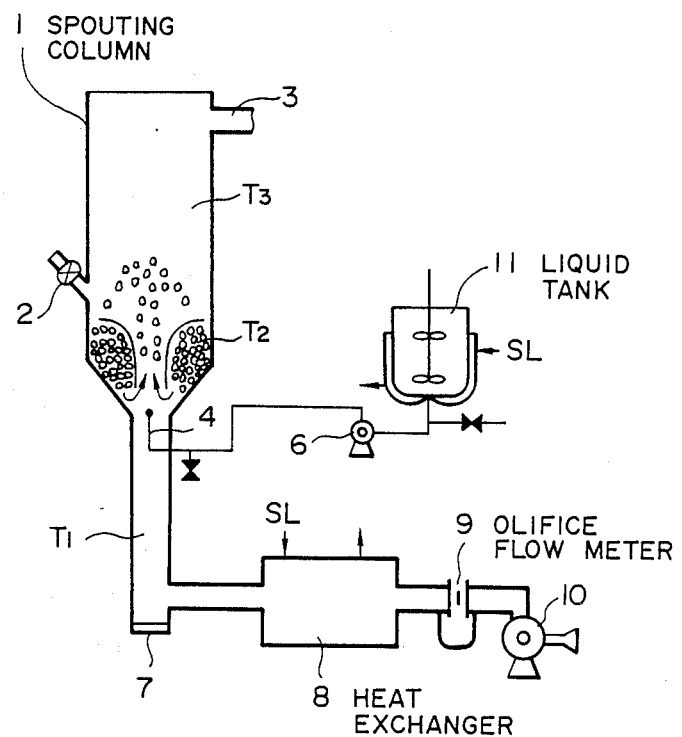
FIG. 1 shows the flow sheet of a spouting coating apparatus employed in Examples of the present invention.

The constitution and effectiveness of the present invention will be described below in more detail.

The granular fertilizer of the present invention contains an ethylene-carbon monoxide copolymer as its indispensable coating component. The copolymer refers generically to high molecular materials produced according to a process for copolymerising ethylene with carbon monoxide, and the content of CO (carbon monoxide) is the copolymer usable in the present invention is in the range of 0.1 to 10% by weight, preferably 0.5 to 3% by weight.

As to the product of present invention, it is possible to constitute the coating even from the above ethylene-carbon monoxide copolymer, alone. However, in many cases, in order to obtain a coating whose dissolving-out properties (dessolving-out duration) are adjustable within a broad range, it is preferred to use the copolymer in combination with other coating-constituting materials.

Examples of such other constituting materials are rubbery resins, ethylene-vinylacetate copolymer resins and powder of talc or the like. When rubbery resins or ethylene-vinyl acetate copolymers are used, it is possible to adjust the dissolving-out properties of the fertilizer component in the granular fertilizer of the present invention depending on the blending proportion of the resin or copolymer (whereas the dissolving-out of the fertilizer component is slow in the case of sole use of the ethylene-carbon monoxide copolymer as an indispensable component).

Further, when powder such as talc is blended, it is not only possible to enhance the dissolving-out properties, but also it is possible to enhance the degradativity of the coating after dissolving-out of the fertilizer component.

Concrete examples of the rubbery resins are raw rubbers prior to vulcanization such as natural rubber, polyisoprene rubber, polybutadiene rubber, styrene-butadiene rubber, etc. and further, thermoplastic rubbery elastomers such as 1,2-syndiotactic polybutadiene, styrene-butadiene block copolymer, styrene-isoprene block copolymer, etc.

When these rubbery resins are used together with the ethylene-carbon monoxide copolymer as an indispensable coating component, a product having variable dissolving-out properties is obtained depending on the proportion at the time of its use and in accordance with the object, and also the degradativity of the resulting coating at the time of practical use is synergistically enhanced.

Further, concrete examples of the ethylene-vinyl acetate copolymer resins are ethylene-vinyl acetate copolymer and ethlene-vinyl acetate-carbon monoxide copolymer, and further, examples of similar copolymers usable for the same object as that of the present invention are ethylene-ethyl acrylate copolymer, ethylene-methacrylic acid copolymer and ionomer resins obtained by crosslinking these copolymers between the respective molecules thereof with a metal ion.

Among these copolymers, the ethylene-vinyl acetate-carbon monoxide copolymer provided with both the effect of promoting the dissolving-out of the fertilizer component from the coated granular fertilizer of the present invention and the effect of promoting the degradation of the coating after the completion of the dissolving-out is a copolymer (resin) which accords well with the object of the present invention.

Next, the physical properties of the powder usable in the present invention will be described.

As to the powder, if it is water-defficultly soluble or water-insoluble, any substances are usable in principle. However, it is necessary to disperse powder having a particle diameter which is ½ or less, preparably ¼ or less the thickness of the aimed capsule i.e. coating, in an organic solvent solution of the above resin or resin composition as uniformly as possible. If the powder is difficult to be dispersed in the organic solvent solution of the above resin or reisn composition, then it is necessary to impart lipophilic nature to the powder by subjecting the surface of the powder to surface-treatment (coating) with a silicone resin or by the like means, or impart a suitable dispersibility to the powder at the time of the above dispersing treatment.

Examples of preferred powder used as a coating material for the coated granular fertilizer of the present invenrion are inorganic substances such as talc, calcium carbonate, clay, diatomaceous earth, silica, metal silicates, metal oxides, sulfur, etc., and organic substances such as starch powder are also usable.

In the preparation of the coating composition for the granular fertilizer with a degradative coating, the ethylene-carbon monoxide copolymer as an indispensable resin component is solely used as the composition or the copolymer is mixed with optional components such as the above rubber resins, ethylene-vinyl acetate copolymer resins and the above powder in a preferred ratio to prepare the composition. The mixing proportions have no particular limitation, but a preferred example thereof is as follows: 3 to 100%, preferably 6 to 100% of the ethylene-carbon monoxide copolymer, 2 to 100%, preferably 2 to 50% of the rubber resins or ethylene-vinyl acetate copolymer resins and 0 to 90%, preferably 20 to 80% of the powder, each in a proportion by weight based on the composition. As to the mixing method, the respective components are mixed in powder form and the mixture is dissolved or dispersed in an organic solvent or the respective components are successively fed into an organic solvent and dissolved or dispersed therein.

If the mixing proportion of the rubbery resins or the ethylene-vinyl acetate copolymer resins in the coating composition obtained as above is increased, the dissolving-out of the fertilizer component at the time of use of the coated granular fertilizer of the present invention is promoted so that a product of a short period type in tems of dissolving-out duration is obtained. On the other hand, if the mixing proportion of the powder in the composition is increased, the dissolving-out of the fertilizer component is similarly promoted, and besides, the coating strength lowers so that it is possible to ease the degradation of the residual capsule i.e. coating after dissolving-out of the fertilizer component through the use of the coated granular fertilizer of the present invention.

In order to concretely design the coated granular fertilizer of the present invention as a whole, the following items are taken into account:

① choice of the granular fertilizer (kind, particle diameter, form, etc.);

② the using manner of the fertilizer (for example, whether or not the coated granular fertilizer alone is stored, transported or scattered); and ③ the dissolving-out duration of the fertilizer component and the degradation duration of the coating to be expected.

Further, at the time of the design, other known coating treatment techniques such as addition of a surfactant, hydrophilic nature-imparting treatment, etc. may be additionally applied.

The kind of the above-mentioned granular fertilizer ① has no particular limitation. Namely it is known chemical fertilizers such as ammonium sulfate, ammonium chloride, ammonium nitrate, urea, potassium chloride, potassium sulfate, potassium nitrate, sodium nitrate, ammonium phosphate, potassium phosphate, calcium phosphate and composite fertilizers composed of two or more kinds of the foregoing.

The coating of the fertilizer of the present invention, after scattering of the fertilizer, is subjected to deteriorative decomposition and degradation by the action of light and enzymes, and the deteriorative decomposition is notable particularly on the surface of soil, some coatings degrade as they are, and others degrade through operations such as cultivation and are finally decomposed by microorganisms.

The coating may deteriorate prior to scattering of the fertilizer on soil, depending on the storage conditions. In such a case, a known ultraviolet absorber or stabilizer such as antioxidant is used to impart a suitable stability to the coating. However, such a stability is preferred to be effected by the use of such a stabilizer that taking the above-mentioned storage period into account, the stabilizer bleeds onto the surface of the coating and is removed therefrom after lapse of the period to lose its stabilizing effect.

The process for producing the coated granular fertilizer of the present invention i.e. the process for coating granular fertilizers may be carried out in the same manner as that disclosed in the above-mentioned known process (Japanese patent publication Nos. Sho 50-99,858 and Sho 60-37,074). According to the process, an organic solvent solution of the above-mentioned coating composition is sprayed onto a granular fertilizer in the state of rolling or fluidization by a spraying means to coat the surface of the fertilizer, while the resulting coated material is at the same time treated by a high speed hot air stream to instantaneously vaporize the organic solvent on the surface of the coated material for drying. For the fluidization of the granular fertilizer in this case, it is most preferred to employ a spouting layer. In this case, a known process found by the present inventors (Japanese patent publication No. Sho 60-102/1985) may also be employed wherein a portion or the total of powder in the coating material of the paesent invention is mixed with and dispersed in a spouting hot air to carry out the above-mentioned coating operation, whereby the powder is dispersed in the coating to be formed on the surface to the granular fertilizer. Such a process is suitable to a case where powder which is difficult to be uniformly dispersed in the organic solvent solution of the coating material composition is used.

The present invention will be described in more detail by way of Examples.

EXAMPLE

I. Production example of the fertilizer of the present invention

FIG. 1 shows a spouting encapsulating apparatus employed in this Example. Numeral 1 shows a spouting column having a column diameter of 250 mm, a height of 200 mm, and air-spouting diameter of 50 mm and a conical angle of 50° and provided with a fertilizer-feeding port 2 and an exhaust gas-discharging port 3. Air through a spouting port is sent from a blower 10 via an orifice flowmeter 9 and a heat-exchanger 8 to the spouting column. The flow quantity is controlled by the flowmeter, the temperature is controlled by the heat-exchanger and the exhaust gas is discharged through the discharging port 3 to the outside of the column. The granular fertilizer used in the encapsulation treatment is fed through the fertilizer-feeding port 2 while a definite quantity of hot air is passed to form a spout. The hot air temperature is detected by a thermometer $T_1$, the particle temperature during encapsulation, by a thermometer $T_2$ and the exhaust gas temperature, by a thermometer $T_3$. When the $T_3$ temperature has reached a definite temperature, an encapsuating liquid is blown through a single-fluid-nozzle 4 toward the spout in the form of spray. The encapsulating liquid is agitated in a liquid tank 11 and when powder is used, the powder is uniformly dispersed also therein. Such liquid or liquid and powder are sent from the tank by way of a pump 6, and the pipe led to the nozzle 4 is made a double pipe through the outer space of which steam is passed so that the temperature cannot be lowered down to 100° C. or less.

When the percentage encapsulation has reached a definite one, the blower is stopped and the encapsulated fertilizer is withdrawn from a withdrawing port 7.

In this Example, the encapsulation was carried out under the following conditions: Single-fluid-nozzle: opening 0.8 mm, full cone type Quantity of hot air: 4 m³/min. Temperature of hot air: 100° C.±2° C. Kind of fertilizer: granular urea of 5 to 8 meshes Quantity of fertilizer at it's feeding port: 10 kg/batch Concentration of encapsulating liquid: solids content 2.5% by weight Quantity of encapsulating liquid fed: 0.5 kg/min. Encapsulation time: 40 minutes

| | |
|---|---|
| Single-fluid-nozzle: | opening 0.8 mm, full cone type |
| Quantity of hot air: | 4 m³/min. |
| Temperature of hot air: | 100° C. ± 2° C. |
| Kind of fertilizer: | granular urea of 5 to 8 meshes |
| Quantity of fertilizer at it's feeding port: | 10 kg/batch |
| Concentration of encapsulating liquid: | solids content 2.5% by weight |
| Quantity of encapsulating liquid fed: | 0.5 kg/min. |
| Encapsulation time: | 40 minutes |
| Percentage encapsulation (relative to fertilizer): | 5.0% |

Percentage encapsulation (relative to fertilizer): 5.0%

In order to evidence the dissolving-out control and capsule degradativity of the fertilizer of the present invention, samples for Example of the present invention and Comparative example shown in Table 1 were prepared.

Further, as a reference example, coating was carried out using polystyrene, but adhesion increased several minutes after initiation of the encapsulation to lose fluidity of particles so that capsulation was impossible.

II. Example of measurement of percentage dissolving-out of the fertilizer of the present invention Each (10 g) of the fertilizers of the present invention prepared in the above item (I) is immersed in water (200 ml) and allowed to stand still at 25° C. After a definite period, it is separated from water and urea dissolved out into water is sought by quantitative analyses. To the resulting fertilizer is added fresh water (200 ml), followed by again allowing it to still stand at 25° C. and seeking urea dissolved out into water by quantitative analyses. Such a procedure is repeated and there is graphed the relationship between the cumulative total of the percentage dissolving-out of urea dissolved out into water and the number of days which lapsed during the repetition, to prepare a dissolving-out rate curve, whereby it is possible to determine the number of days reaching a percentage dissolving-out of 80%.

The percentage dissolving-out into water after 24 hours in the item of dissolving-out of Table 1 refers to a percentage dissolving-out into water after 24 hours at 25° C., and the number of days of 80% dissolving-out was sought by preparing the dissolving-out rate curve in the measurement of the percentage dissolving-out.

It is seen that any of the product of the present invention has a low percentage dissolving-out after 24 hours and is well encapsulated. Further it is also seen that the number of days of 80% dissolving-out can be controlled by the ratio of the ethylene-carbon monoxide copolymer to resin B and also by the blending proportion of powder.

III. Example of measurement of capsule degradativity

Each (5 g) of the fertilizers prepared in the item (I) was subjected to preparation of a pinhole each granule with a needle, followed by allowing the resulting granules to stand still in water, whereby the inside urea is completely dissolved out to prepare hollow capsules, which are then dried to prepare samples to be tested.

Dried sand of 12 meshes-pass is placed in a square box of polyvinyl chloride resin of 15 cm long, 15 cm wide and 15 cm high so as to be almost full of the sand, followed by arranging the purified hollow capsules on the surface of the sand, fitting a quartz sheet of 2 mm thick onto the box so as to prevent rain, allowing the resulting box to stand outdoors over six months (April until September), thereafter placing the total quantity of the sand and the capsules in a V type mixer provided with rotating blades, mixing them with stirring for 30 minutes, thereafter separating the capsules from the sand with a sieve of 10 meshes and seeking the percentage of 10 meshes-on capsules relative to the sample capsules. This percentage is referred to as degree of degradation and shown in Table 1.

TABLE 1

| | | Encapsulating material (g) | | | Dissolving-out | | Degree of degradation % |
|---|---|---|---|---|---|---|---|
| No. | | Resin A | Resin B | Powder | Percentage dissolving-out into water after 24 hours % | Number of days of 80% dissolving-out day | |
| Example | 1 | *1C$_2$—CO 500 | 0 | 0 | 0.1> | 830 | 98 |
| | 2 | *1C$_2$—CO 200 | 0 | *2Talc 300 | 0.1 | 123 | 99 or more |
| | 3 | *1C$_2$—CO 300 | *3Rubber 200 | 0 | 0.2 | 197 | " |
| | 4 | *1C$_2$—CO 100 | *3Rubber 100 | Talc 300 | 0.2 | 55 | " |
| | 5 | *1C$_2$—CO 100 | *3Rubber 100 | *4CaCO$_3$ 300 | 1.8 | 52 | " |
| | 6 | *1C$_2$—CO 150 | *5EVA 50 | *4CaCO$_3$ 300 | 0.3 | 70 | 89 |
| Comp. example | 1 | *6PE 500 | 0 | 0 | 0.1> | 850 | 3 |
| | 2 | *6PE 200 | 0 | *2Talc 300 | 0.1 | 133 | 6 |
| | 3 | *6PE 300 | Rubber 200 | 0 | 0.3 | 205 | 82 |
| | 4 | *6PE 100 | Rubber 150 | Talc 300 | 0.2 | 61 | 98 |
| | 5 | *6PE 150 | EVA 50 | Talc 300 | 0.2 | 73 | 2 |
| Ref. example | 1 | *7PS 500 | 0 | 0 | — | — | — |
| | 2 | 100 | Rubber 100 | Talc 300 | — | — | — |

Note relative to symbols in Table 1
*1C$_2$—CO: ethylene-carbon monoxide copolymer CO %: 0.95, MI = 0.75
*2Talc: particle size 10μ (average)
*3Rubber: styrene-butadiene block copolymer styrene: 38%, butadiene: 62% MI: <1, d = 0.94
*4CaCO$_3$: calcium carbonate, 5μ (average)
*5EVA: ethylene-vinylacetate copolymer MI = 20, VAc = 33% by weight
*6PE: polyethylene MI = 20, d = 0.922
*7PS: polystyrene MI = 20, d = 1.05
Reference example: when PS is used, coating is impossible; sample cannot be prepared; hence there is no measurement value.

What we claim is:

1. A granular fertilizer with a degradative coating comprising as its active ingredients an ethylene-carbon monoxide copolymer and at least one resin selected from the group consisting of rubbery resins and ethylene-vinyl acetate copolymer resins, the carbon monoxide content of the ethylene-carbon monoxide copolymer being within the range of 0.1 to 10% by weight, the mixing proportion of the ethylene-carbon monoxide copolymer being at least 3% by weight of the coating and the mixing proportion of the rubbery resin or ethylene-vinyl acetate copolymer being at least 2% by weight of the coating.

2. A granular fertilizer with a degradative coating according to claim 1 wherein said rubber resin is at least one resin selected from the group consisting of natural rubber, polyisoprene, polybutadiene, styrene-butadiene block copolymers and styrene-isoprene block copolymers and said ethylene-vinyl acetate copolymer resins are at least one resin selected from the group consisting of ethylene-vinyl acetate coplymer and ethylene-vinyl acetate-carbon monoxide copolymer.

3. A granular fertilizer with a degradative coating according to claim 1 wherein the carbon monoxide content of said copolymer is within the range of 0.5 to 3 percent by weight.

4. A granular fertilizer with a degradative coating according to claim 1 wherein said coating includes 20–80% by weight of a water-difficultly soluble or water-insoluble powder mixed therein having a particle diameter which is ½ or less the thickness of the coating.

5. A granular fertilizer with a degradative coating according to claim 4 wherein said water-difficultly soluble or water-insoluble powder is at least one member selected from the group consisting of talc, calcium carbonate, clay, diatomaceous earth, silica, metal silicates, metal oxides, sulfur and starch powder.

6. A granular fertilizer with a degradative coating comprising as its active ingredients, an ethylene-carbon monoxide copolymer and at least one resin selected from the group consisting of an ethylene ethyl acrylate copolymer and ethylene-methacrylic acid copolymer, the carbon monoxide content of the ethylene-carbon monoxide copolymer being within the range of 0.1 to 10% by weight, the mixing proportion of the ethylene-carbon monoxide copolymer being at least 3% by weight of the coating and the mixing proportion of said at least one resin being at least 2% by weight.

7. A granular fertilizer with a degradative coating according to claim 6 wherein the carbon monoxide content of said copolymer is within the range of 0.5 to 3 percent by weight.

8. A granular fertilizer with a degradative coating according to claim 6 wherein said coating includes 20–80% by weight of a water-difficultly soluble or water-insoluble powder mixed therein having a particle diameter which is ½ or less the thickness of the coating.

9. A granular fertilizer with a degradative coating according to claim 8 wherein said water-difficultly soluble or water-insoluble powder is at least one member selected from the group consisting of talc, calcium carbonate, clay, diatomaceous earth, silica, metal silicates, metal oxides, sulfur and starch powder.

* * * * *